No. 890,316. PATENTED JUNE 9, 1908.
F. L. O. WADSWORTH.
TAKE-DOWN APPARATUS FOR GLASS CYLINDERS.
APPLICATION FILED MAY 10, 1906.
3 SHEETS—SHEET 2.
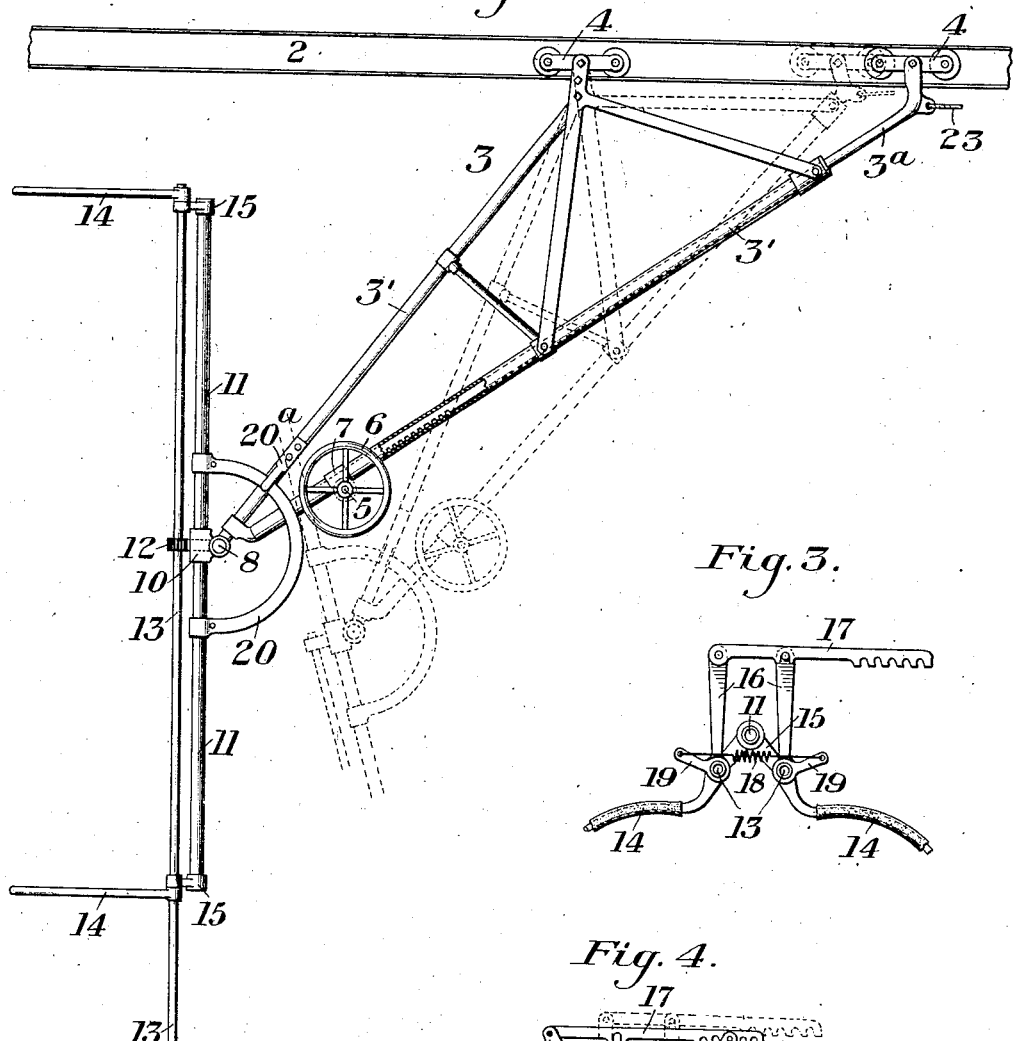

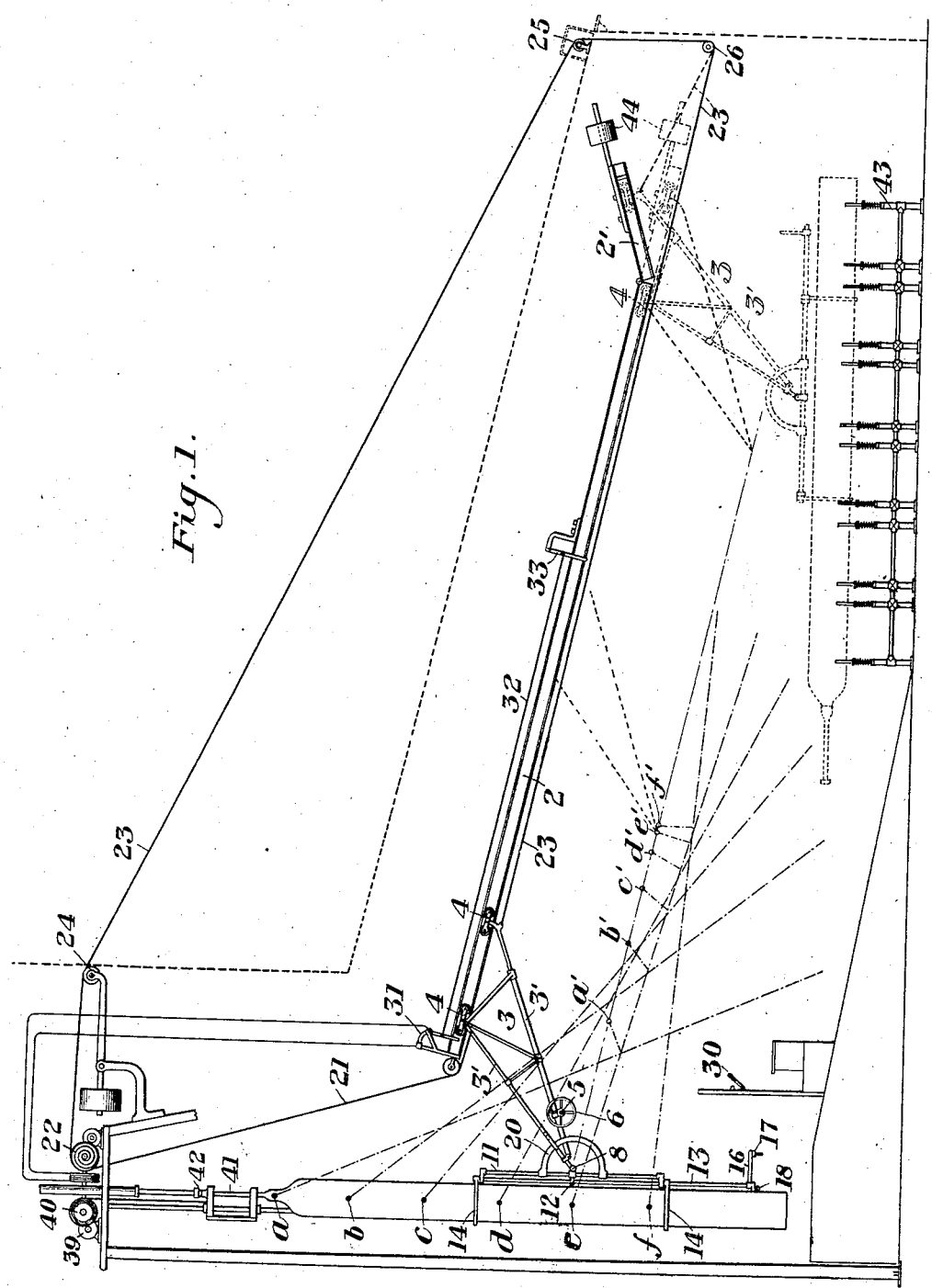

No. 890,316.  
F. L. O. WADSWORTH.  
TAKE-DOWN APPARATUS FOR GLASS CYLINDERS.  
APPLICATION FILED MAY 10, 1906.

PATENTED JUNE 9, 1908.

3 SHEETS—SHEET 3.

WITNESSES  
R A Balderson  
Warren W. Swartz

INVENTOR  
F. L. O. Wadsworth  
by Bakewell & Byrnes  
his attys

UNITED STATES PATENT OFFICE.

FRANK L. O. WADSWORTH, OF PITTSBURG, PENNSYLVANIA, ASSIGNOR TO WINDOW GLASS MACHINE COMPANY, OF PITTSBURG, PENNSYLVANIA, A CORPORATION OF NEW JERSEY.

TAKE-DOWN APPARATUS FOR GLASS CYLINDERS.

No. 890,316.     Specification of Letters Patent.     Patented June 9, 1908.

Application filed May 10, 1906. Serial No. 316,049.

*To all whom it may concern:*

Be it known that I, FRANK L. O. WADSWORTH, of Pittsburg, Allegheny county, Pennsylvania, have invented certain new and useful Take-Down Apparatus for Glass Cylinders, of which the following is a full, clear, and exact description, reference being had to the accompanying drawings, forming part of this specification, in which—

Figure 5:
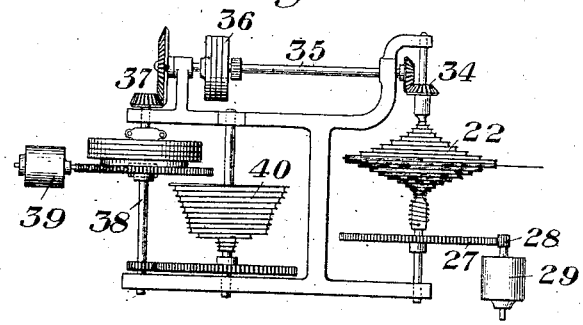
Figure 6:
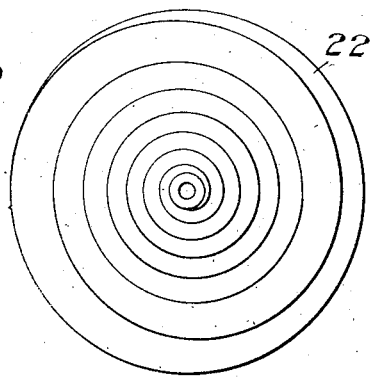
Figure 7:
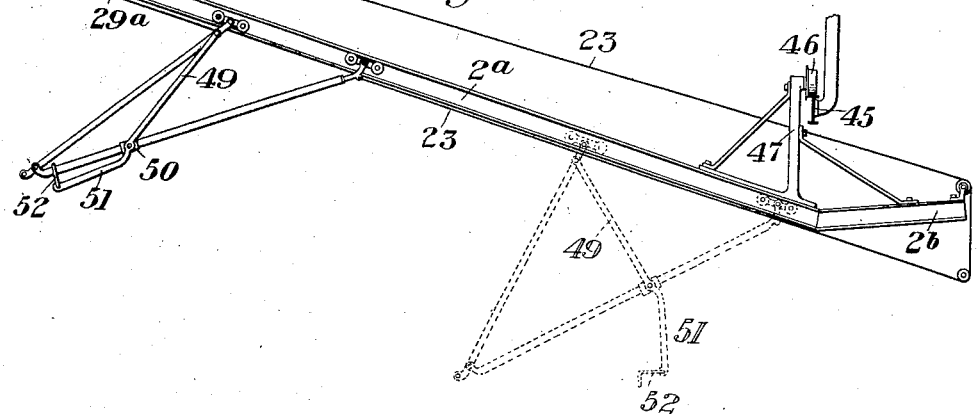

Figure 1 is a side elevation showing one form of apparatus constructed in accordance with my invention; Fig. 2 is an enlarged detail view of the traveling grip frame; Figs. 3 and 4 are detail views of the grips in different positions; Fig. 5 is a top plan view of the drum mechanism; Fig. 6 is a side elevation of the take-down drum; and Fig. 7 is a partial side elevation showing a modified form.

My invention relates to the taking down of glass cylinders which are drawn upwardly from a bath.

The object of the invention is to provide an effective apparatus which will avoid breakage and the use of skilled labor, by which the cylinder may be engaged in vertical position, and then carried sidewise and lowered upon a suitable horse or support.

In the drawings, 2 represents a stationary inclined track, which extends from a point adjacent to the drawing mechanism (indicated by the cage and blow pipe 41), and on which travels the triangular frame 3, having trolleys 4, 4 moving in suitable recesses or double tracks on the support 2. These tracks are so arranged as to hold the frame at a fixed angle to the track during the travel of the frame. The side members 3', 3' of the triangular frame may be fixed relative to each other; but I prefer to arrange them so that the shape of the triangle may be changed to assist in lowering the cylinder when desired.

In the form shown in Figs. 1 and 2, the member 3' is of telescopic form, the portion 3ª being a rod which slides within the other tubular portion, and is provided with a rack engaged by a pinion on a shaft 5 having hand-wheels 6. The shaft 5 is mounted on a collar 7, and the pinion projects through a slot in the tubular portion, thus allowing the length of the arm 4 to be adjusted. By turning the hand wheel, the frame members may be moved from the position shown in full lines to that shown in dotted lines in Fig. 2, or into other positions. The frame members 3', 3' at their lower apex are provided with a bearing 8 in which is pivoted the rack bar 9, (Fig. 4) which slides through a casting 10 in which are secured the adjacent ends of the registering rods 11. The teeth of the double rack bar engage pinions 12 secured on longitudinal rods 13, at the ends of which are provided the gripping arms 14. The shafts 13 turn in bearings secured in forks 15 (Fig. 3) projecting from the upper and lower ends of rods 11. The rods 13 are continued downwardly below the lower grips, and to these extensions are secured levers 16, one of which is provided with a link 17 having slots arranged to engage a pin upon the other lever. A spring 18 is connected to short lever arms 19 upon the rods 13, the spring being so arranged that it will tend to hold the grips in open and in closed position. Fig. 3 shows the parts in open position, while Fig. 4 shows them in closed position. It will be noted that when the glass cylinder is in inclined or horizontal position, the gravity effect through the rack and pinion mechanism will also increase the hold of the grips upon the cylinder. This is the function of this rack and pinion mechanism.

In order to prevent oscillation or improper swinging of the cylinder during removal and lowering, I preferably provide a friction brake mechanism. This is especially desirable when the neck or upper portion of the cylinder breaks away from the bait or blow-pipe during lowering. In the form shown (Fig. 2), this brake device consists of a sector 20, which is engaged by a leaf-spring 20ª on one of the arms of the triangular frame. The leaf-spring bears upon the sector with sufficient pressure to dampen the swinging of the cylinder.

The take-down frame may be moved along its track, either by gravity or positively. I prefer the positive movement, as thereby any sticking or checking of its movement is obviated. In the form shown, a cord 21 extends from the take-down frame 3 up to a winding drum 22. The upper end of the cord 21 winds about one side of this drum, while to the other side is secured the cord 23 which extends over the counterweighted tightening pulley 24, and thence over pulleys 25 and 26 and back to the frame to which its end is secured. The winding drum 22 is preferably shaped as shown in Figs 5 and 6. It is made in duplicate halves with a helical groove on each half of increasing pitch. As the cord 21 winds up on one portion, the cord 23 unwinds on the other portion, while the belt tightener device 24 (Fig. 1) compensates for varying amounts of slack. A large toothed wheel 27 on the shaft of the winding drum intermeshes with the pinion 28 on the shaft of an electric motor 29. The connections for the electric motor extend to a hand-controlled switch device 30, which is at the operator's pulpit. This circuit is also provided with a circuit breaker 31, which is located at the upper end of the stationary track and is moved in one direction by contact of the triangular frame, while it is moved in the opposite direction by the cord connection 32 leading to lever 33, which is at an intermediate point of the track and in the path of the frame.

The shaft of winding drum 22 is connected through bevel gearing 34 to a shaft 35 having a magnetic clutch connection 36 with bevel gearing 37 on the shaft 38 of the hoisting drum mechanism, having the electric motor 39. 40 is the hoisting drum proper for the cage of the drawing device which supports blow pipe 41. The circuit breaker 31 when actuated by the frame as it reaches the upper end of the track will open the circuit to motor 29 and close the circuit to the magnetic clutch 36, thus locking the two winding drums together. The operator will then lower the cage, and at the same time positively move the take-down frame along its track. The blow-pipe 41 is pivoted at 42, and as the point 42 reaches the positions marked $a$, $b$, $c$, $d$, $e$ and $f$, the pivotal point 8 of the take-down frame passes through the positions $a'$, $b'$, $c'$, $d'$, and $f'$. At the position $f'$ the frame strikes the lever 33, thus releasing the magnetic clutch 36 and completing the circuit for the motor 29. The operator at this point lifts the blow-pipe out of its supporting hooks, and further movement of the frame along the track may be either by gravity or the operator may throw in the motor 29 and positively move the frame through the remainder of its travel. The operator can then lower the cylinder upon the horse shown at 43 by manually changing the shape of the triangular frame, as above described, or the cylinder may be lowered by a differentially inclined portion of the track which may be either stationary or pivoted. If pivoted, the track section may be either moved manually or automatically.

In the form shown, the track section 2' is pivoted to the main track section, and provided with an adjustable counterweight 44. When the rear trolley of the frame enters this pivoted portion of the track the weight of the cylinder will act in opposition to the weight 44 and gradually tilt the track into the position shown in Fig. 1, the glass cylinder thus being lowered upon the horse. When the operator then disengages the grips by the link mechanism, the weight 44 will return the pivoted track section to its normal position in line with the stationary track, thereby lifting the grips away from the cylinder. The operator may then draw the take-down frame to an intermediate position in the track by use of the motor 29 where it will remain until the next cylinder is drawn. After the next cylinder is drawn, he then moves the frame forwardly and upwardly into the position shown in Fig. 1, by means of the motor 29 and engages the cylinder with the grips, after which the operation is repeated as above described.

In Fig. 7 I show a modified form of the apparatus, which provides one take-down device for a series of drawing machines. In this form, 45 represent tracks carried on suitable supports and extending in front of a number of drawing machines. On these tracks travel the trolleys 46 carrying the hangers 47, on which the stationary track $2^a$ is mounted. In this form the motor $29^a$ is carried on the stationary track, and is supplied with current through a trolley device 48. The drum $22^a$ may be the same as before, and have any suitable mechanical connection to the motor $29^a$. In this form also, I show another construction of the take-down frame. In this case the frame members are pivoted at their ends and a link 49 extends from the top pivot of the upper frame member to a collar 50, which slides on the lower frame member. The link 49 is provided with a handle extension 51, by which the frame may be drawn into different shapes, one of which is shown at the right-hand of Fig. 7 in dotted lines. 52 indicates a hook by which the parts may be locked in the position shown in full lines.

In case where the take-down mechanism is movable along the pots to serve a series of drawing frames, the connections between the winding drum of the take-down device and the hoisting drums for the drawing frames, is an electrical one. The operations in this case are substantially the same as in the first form.

The advantages of my invention will be apparent to those skilled in the art. The operations are simple and easily controlled, and breakage of the glass is greatly lessened. The movements in the preferred form are positive and under complete control. Mistakes on the part of the operator are avoided, since the relative movements must take place in the proper sequence. The mechanism is simple, may be cheaply made, and is not liable to get out of order. The apparatus may be applied to existing plants without materially changing them, and is easily applied to drawing apparatus in low buildings. The cost of labor in taking down is greatly reduced and all danger of injury to the workmen is avoided.

Many variations may be made in the form and arrangement of the frame, track, the grips, &c., without departing from my invention.

I claim:—

1. In a take-down device for glass cylinders a drawing device, an inclined track, adjacent to the drawing device, and a frame movable on the track having grips for the cylinder; substantially as described.

2. In a take-down device for glass cylinders a drawing device, an inclined track, adjacent to the drawing device, a frame movable along the track, grippers mounted on the frame, and mechanism for positively moving the frame along the track in at least one direction; substantially as described.

3. In a take-down device for glass cylinders a drawing device, an inclined track adjacent to the drawing device, a frame movable along the track, grippers mounted on the frame, and connections for positively moving the frame along the track in both directions; substantially as described.

4. In a take-down device for glass cylinders, a drawing device, a track and movable frame having grip devices, and connections arranged to move said frame simultaneously with the movement of the drawing device; substantially as described.

5. In a take-down device for glass cylinders, a drawing device a track, a frame movable along the track having grippers, and connections arranged to move the frame simultaneously with the downward movement of the drawing device; substantially as described.

6. In a take-down device for glass cylinders, a drawing device a track, a frame movable along the track having grippers, and connections arranged to positively move the frame simultaneously with the downward movement of the drawing device; substantially as described.

7. In a take-down device for glass cylinders, a drawing device a movable frame having grippers, and connections arranged to move the frame at the same time with the downward movement of the drawing device, and at a predetermined rate relative thereto; substantially as described.

8. In a take-down device for glass cylinders, a drawing device a movable frame having grippers, and connections arranged to move the frame at the same time with the downward movement of the drawing device and at a predetermined rate relative thereto, and mechanism for varying the rate of speed of the movable frame; substantially as described.

9. In a take-down device for glass cylinders, a drawing device a movable frame having grippers, connections arranged to move the frame simultaneously with the downward movement of the drawing device, and means for severing said connections; substantially as described.

10. In a take-down device for glass cylinders, a drawing device a movable frame having grippers, connections arranged to move the frame simultaneously with the downward movement of the drawing device, and means for severing said connections at a predetermined point in the travel of the frame; substantially as described.

11. In a take-down device for glass cylinders, a drawing device a movable frame having grippers arranged to engage the cylinder, and connections arranged to move back the frame while the upper end of the cylinder is supported on the drawing device; substantially as described.

12. In glass drawing apparatus, a drawing device including a cage having a bait or blow-pipe with a pivotal connection to the cage, and a movable frame having grippers arranged to engage the glass cylinder and draw it back while still supported on the cage; substantially as described.

13. In glass drawing apparatus, a drawing device, a blow-pipe or bait having pivotal connection therewith, a movable take down frame having grippers arranged to engage the cylinder, and mechanism for moving the take-down frame away from the drawing device while the bait or blow-pipe is supported on the drawing device and during lowering of the drawing device; substantially as described.

14. In take-down apparatus for glass cylinders a drawing device, a movable frame having grippers arranged to engage the cylinder while supported by the drawing device, and means for varying the shape of the frame; substantially as described.

15. In take-down apparatus for glass cylinders a drawing device, a track, a frame movable thereon and having grippers to engage the glass while supported by the drawing device, and means for varying the shape of said frame; substantially as described.

16. In take-down apparatus for glass cylinders a drawing device, an inclined track, a frame movable thereon and having grippers for the glass, and means for varying the angle of the frame or a part thereof relative to the track and the drawing device; substantially as described.

17. In take-down apparatus for glass cylinders a drawing device, an inclined track, a frame movable thereon and having grippers for the glass, and means for varying the front bar or member of the frame relative to the inclined track and the drawing device; substantially as described.

18. In take-down apparatus for glass cylinders a drawing device, a track, a frame movable along the track and having gripping mechanism pivotally connected thereto, and connections arranged to move back the frame and simultaneously tilt the cylinder; substantially as described.

19. In take-down apparatus for glass cylinders a drawing device, a movable frame having grippers, and connections arranged to simultaneously move the frame backwardly and tilt the cylinder during said movement; substantially as described.

20. In take-down apparatus for glass cylinders a drawing device, a movable frame having grippers arranged to engage the glass cylinder, and connections arranged to tilt the cylinder as the frame is moved backwardly; substantially as described.

21. In take-down apparatus for glass cylinders a drawing device, a track, a frame movable along the track and having gripping mechanism pivotally connected thereto, and connections arranged to tilt the gripping mechanism on the frame as the frame is moved backwardly along the track; substantially as described.

22. In take-down apparatus for glass cylinders a drawing device, a track having a rear portion extending at an angle to the track proper, and a frame arranged to move along said track; substantially as described.

23. In take-down apparatus for glass cylinders a drawing device, an inclined track having a rear portion extending at an angle to the track proper, and a frame arranged to move along said track; substantially as described.

24. In take-down apparatus for glass cylinders a drawing device, a track having a pivoted rear section and a frame movable along the track and having grippers; substantially as described.

25. In take-down apparatus for glass cylinders a drawing device, a track having a pivoted rear section, a frame movable along the track and having grippers, and mechanism for tilting the rear track section as the frame moves back upon it; substantially as described.

26. In take-down apparatus for glass cylinders a drawing device, a track having a pivoted rear section, a frame movable along the track and having grippers, mechanism for tilting the rear track section as the frame moves back upon it, and means for returning the track section to its normal position after the cylinder is released; substantially as described.

27. In take-down apparatus for glass cylinders a drawing device, a movable frame, mechanism arranged to positively move the frame in at least one direction, and severable connections between said mechanism and the hoisting mechanism for the drawing device; substantially as described.

28. In take-down apparatus for glass cylinders a drawing device, a track, a frame movable along the track and having gripping mechanism, a flexible connection arranged to move the frame in one direction along the track, and winding mechanism for the flexible connection; substantially as described.

29. In take-down apparatus for glass cylinders a drawing device, a track, a frame movable along the track and having grippers, and flexible connections arranged to move the frame positively in both directions along said track; substantially as described.

30. In take-down apparatus for glass cylinders a drawing device, a track, a frame movable along the track and having grippers, a winding drum having a flexible connection to the frame, and means for connecting said winding drum to or disconnecting it from the cage hoisting mechanism; substantially as described.

31. In take-down apparatus for glass cylinders a drawing device, a track, a frame movable along the track and having grippers, flexible connections arranged to move the frame positively in both directions, and a winding mechanism for said connections; substantially as described.

32. In take-down apparatus for glass cylinders a drawing device, a track, a frame movable along the track and having grippers, flexible connections arranged to move the frame positively in both directions, a winding mechanism for said connections, and means for connecting the winding mechanism to and disconnecting it from the drawing device; substantially as described.

33. In take-down apparatus for glass cylinders a drawing device, a track, a frame movable along the track and having grippers, a winding mechanism having flexible connection with the frame, and mechanism for automatically connecting said winding mechanism to and disconnecting it from the drawing device at predetermined points in its travel; substantially as described.

34. In take-down apparatus for glass cylinders a drawing device, a rearwardly and downwardly inclined track, a frame movable thereon having grippers, and mechanism for positively moving the frame toward the cylinder, said frame moving backwardly by gravity through at least a part of its travel; substantially as described.

35. In take-down apparatus for glass cylinders a drawing device, a track, a frame movable thereon and having grippers, and mechanism for automatically varying the distance between the grips and the track; substantially as described.

36. In take-down apparatus for glass cylinders a drawing device, a track, a frame movable thereon and having grippers, and mechanism for automatically varying the distance between the grips and the track at a predetermined point in the travel of the frame; substantially as described.

37. In glass drawing apparatus a drawing device, a take-down device, a pulpit having control mechanism arranged to govern the drawing mechanism and the take-down mechanism; substantially as described.

38. In glass drawing apparatus a drawing device, a movable take-down frame having grippers, actuating connections for the cage and take-down frame, and a pulpit having control devices for both said sets of apparatus; substantially as described.

39. The combination in glass drawing apparatus, with a drawing device, a movable take-down device for the glass cylinders when drawn, and cylinder grips loosely connected thereto, of a brake device for checking the movement of the cylinder and grips; substantially as described.

40. In take-down apparatus for glass cylinders a drawing device, a track, a frame movable along the track, grippers movably connected to said frame, and a brake device for the movable connections; substantially as described.

In testimony whereof, I have hereunto set my hand.

FRANK L. O. WADSWORTH.

Witnesses:
JOHN MILLER,
H. M. CORWIN.